United States Patent
Kovalenko et al.

(10) Patent No.: US 12,282,166 B2
(45) Date of Patent: Apr. 22, 2025

(54) ELECTRONIC DEVICES AND CORRESPONDING METHODS FOR DELIVERING AN EXTENDED DISPLAY IDENTIFICATION (EDID) EXTENSION IDENTIFYING INTERPUPILLARY DISTANCE METRICS

(71) Applicant: Motorola Mobility LLC, Chicago, IL (US)

(72) Inventors: Igor Kovalenko, Palatine, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 59 days.

(21) Appl. No.: 18/138,619

(22) Filed: Apr. 24, 2023

(65) Prior Publication Data

US 2024/0353681 A1    Oct. 24, 2024

(51) Int. Cl.
*G02B 27/01* (2006.01)
*G06F 1/16* (2006.01)
(Continued)

(52) U.S. Cl.
CPC ......... *G02B 27/0172* (2013.01); *G09G 3/001* (2013.01); *G09G 5/006* (2013.01); *G02B 2027/0123* (2013.01); *G02B 2027/014* (2013.01); *G02B 2027/0178* (2013.01); *G09G 2370/042* (2013.01); *G09G 2370/047* (2013.01);
(Continued)

(58) Field of Classification Search
CPC ....... G09G 2370/042; G09G 2370/047; G09G 2370/16; G09G 2370/22; G09G 3/001; G09G 5/006; G02B 27/0172; G02B 2027/0123; G02B 2027/014; G02B 2027/0178

See application file for complete search history.

(56) References Cited

U.S. PATENT DOCUMENTS 12,002,435 B1 *  6/2024  Kumar Agrawal .... G09G 5/005
2019/0041643 A1 *  2/2019  Chang .................. H04N 13/398
(Continued)

FOREIGN PATENT DOCUMENTS

CA    2928248 C  *  3/2023  ........... G02B 27/017

OTHER PUBLICATIONS

"Adjusting the IPD on the Headset—Vive Support", Unknown exact publication date but prior to filing of present application; Viewed online Apr. 6, 2023 at https://www.vive.com/us/support/vive-pro-eye/category_howto/adju...nce%20(IPD)%20is%20the,have%20a%20better%20viewing%20experience.

(Continued)

*Primary Examiner* — Amare Mengistu
*Assistant Examiner* — Jennifer L Zubajlo
(74) *Attorney, Agent, or Firm* — Philip H. Burrus, IV

(57) ABSTRACT

An electronic device includes a communication device and one or more processors operable with the communication device. The one or more processors, in response to the communication device identifying a port establishing a display data channel, causing the communication device to transmit an extended display identification (EDID) extension or second-generation EDID file structure comprising a wearable glass projection device content rendering parameter, which can be expressed as an interpupillary distance.

20 Claims, 7 Drawing Sheets

(51) Int. Cl.
 *G09G 3/00* (2006.01)
 *G09G 5/00* (2006.01)

(52) U.S. Cl.
 CPC ..... *G09G 2370/16* (2013.01); *G09G 2370/22* (2013.01)

(56) References Cited

U.S. PATENT DOCUMENTS

| | | | | |
|---|---|---|---|---|
| 2019/0129181 | A1* | 5/2019 | Polcak | G02B 27/0093 |
| 2022/0239949 | A1* | 7/2022 | Hannuksela | H04N 21/2353 |
| 2023/0011002 | A1* | 1/2023 | Fernandez Hermida | G06T 7/70 |
| 2023/0359270 | A1* | 11/2023 | Choi | G06F 3/013 |
| 2024/0118792 | A1* | 4/2024 | Stephens | G06F 3/0483 |
| 2024/0212570 | A1* | 6/2024 | Kumar Agrawal | G06F 13/4081 |

OTHER PUBLICATIONS

Katzmaier, David, "LG Display's crazy 65-inch OLED TV can roll up like a poster", Published Jan. 9, 2018; Available online at https://www.cnet.com/tech/home-entertainment/lg-display-crazy-65-inch-oled-tv-can-roll-up-like-a-poster-ces-2018/.

Kendall, et al., "Essentials of DisplayPort Display Stream Compression (DSC) Protocols)", Webinar slide deck Feb. 2018; By Teledyne Lecroy.

Matthes, Jonah, "What is HDMI EDID? Everything You Need to Know!", Published Feb. 24, 2022; available online at https://thehometheaterdiy.com/hdmi-edid/.

* cited by examiner

| ADDRESS | DATA | GENERAL DESCRIPTION |
|---|---|---|
| 0-7 | Header | Constant Fixed Pattern |
| 8-9<br>10-11<br>12-14<br>16-17 | Manufacturer ID<br>Product ID Code<br>Serial Number<br>Manufacture Date | Display Product Identification |
| 18<br>19 | EDID Version No.<br>EDID Revision No. | EDID Version Information |
| 20<br>21<br>22<br>23<br>24 | Video Input Type<br>Horizontal Size (cm)<br>Vertical Size (cm)<br>Display Gamma<br>Supported Features 402 | Basic display parameters. Video input type, display size, power management, sync, color space, timing capabilities and preferences. |
| 25-34 | Color Characteristicis | Color space Definition |
| 35-36<br>37<br>38-53<br>54-71<br>72-89<br>90-107<br>108-125 | Established Supported Timings<br>Manufacturer's Reserved Timing<br>EDOD Standard Timings Supported<br>Detailed Timing Descriptior Block 1<br>Detailed Timing Descriptor Block 2<br>Detailed Timing Descriptor Block 3<br>Detailed Timing Descriptor Block 4 | Timing information for all resolutions supported by the display. |
| 126 | Extension Flag | Number of optional extension blocks |
| 127 | Checksum | |

-- PRIOR ART --

| ADDRESS | GENERAL DESCRIPTION |
|---|---|
| 0 | Always "N," where N is the new extension |
| 1 | Revision number |
| 2 | Pointer to timing descriptors |
| 3 | Number of timing descriptors |
| 4 to d-1 | Data block description indicating interpupillary distance for companion device (can be represented as a distance or alternatively as default +/- per eye adjustment) |
| d to d+17 | First 18-byte detailed timing descriptor |
| ⋮ | ⋮ |
| d+18(n-1) to d+18n-1 | Final 18-byte detailed timing descriptor |
| d+18n to 126 | "0" Padding |
| 127 | Checksum |

FIG. 5

ELECTRONIC DEVICES AND CORRESPONDING METHODS FOR DELIVERING AN EXTENDED DISPLAY IDENTIFICATION (EDID) EXTENSION IDENTIFYING INTERPUPILLARY DISTANCE METRICS

BACKGROUND

Technical Field

This disclosure relates generally to electronic devices having communication circuits, and more particularly to electronic devices engaged in the presentation of images for a user from signals received in digital form, including data transmission and telegraphic communication, from another electronic device.

Background Art

Many wearable glass projection devices use an extended display identification (EDID) data communication protocol to transfer information regarding the capabilities of the device. Illustrating by example, when a display device having EDID capabilities powers up while coupled to a source device operable to deliver content to the display device, the display device may transmit an EDID file structure that exposes information about the display device to inform the source device as to the operating capabilities the display device possesses. While this transfer works well in practice, as more complex display devices are developed the problem of ensuring proper EDID information becomes more critical. It would be advantageous to have improved electronic devices and corresponding methods that assist in this respect.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 4 illustrates a prior art EDID file.

FIG. 5 illustrates one explanatory EDID extension in accordance with one or more embodiments of the disclosure.

Figure 1:
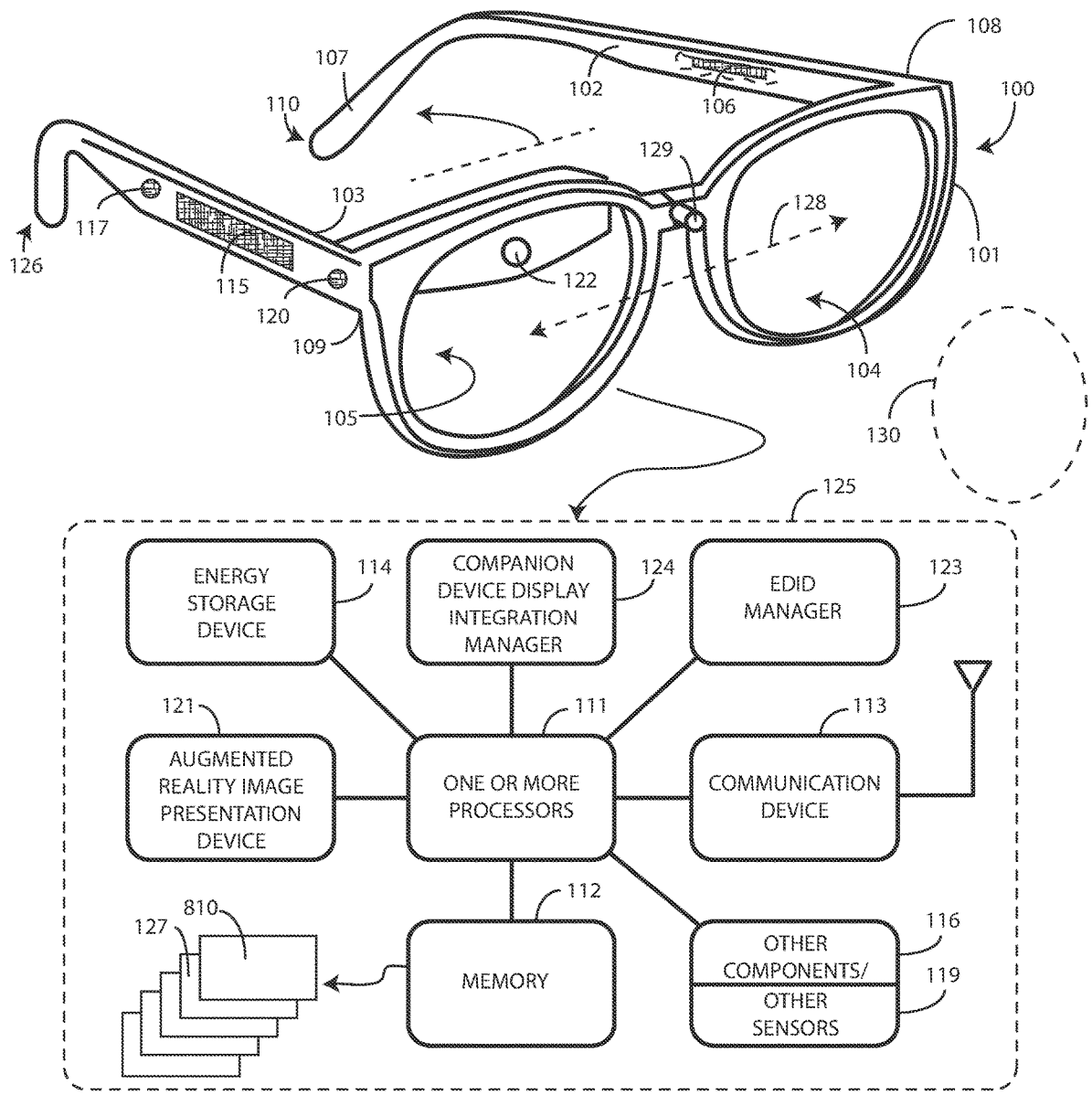
FIG. 1 illustrates one explanatory wearable glass projection device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to determining, in an electronic device electronically in communication with a wearable glass projection device, an indication of an interpupillary distance associated with a physical configuration of the wearable glass projection device so that the electronic device can properly render content for presentation by the wearable glass projection device. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of detecting a wearable glass projection device establishing a display data channel with an electronic device and transmitting an EDID extension identifying an interpupillary distance associated with a physical configuration of the wearable glass projection device as described herein. The non-processor circuits may include, but are not limited to, a radio receiver, a radio transmitter, signal drivers, clock circuits, power source circuits, and user input devices.

As such, these functions may be interpreted as steps of a method to perform detecting, with a communication device, a source device establishing a display data channel with a communication device of a wearable glass projection device, writing, with one or more processors, an indication of an interpupillary distance associated with a physical configuration of the wearable glass projection device to an EDID extension, and transmitting the EDID extension using the display data channel in response to the communication device detecting establishment of the display data channel. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure contemplate that wearable glass projection devices, examples of which include augmented reality glasses and virtual reality headsets, can be coupled to a wide range of source devices, examples of which include computers, smartphones, tablet computers, set-top boxes, gaming devices, and multimedia players. When such a source device is connected to a wearable glass projection device, the source device provides images and sounds signals to the wearable glass projection device. The wearable glass projection device, in turn, then delivers images and sounds to an environment of the system defined by the source device, the wearable glass projection device, and the display data channel coupling the two together.

Indeed, many modern electronic devices are equipped with a content redirection feature. Using smartphones manufactured by Motorola Mobility™ as one illustrative example, some models are equipped with their Ready For™, which is a feature that allows the Ready For™ device to act as a source device and connect to a wearable glass projection device such as a pair of augmented reality glasses or a virtual reality headset capable of presenting imagery to the eyes of a wearer. Using the Ready For™ feature, users can stream video content to the perceived "display" of the wearable glass projection device with no loss in performance. Illustrating by example, when rendered properly the resolution of the images presented by the wearable glass projection device is incredibly high in definition with a frame rate that presents content without flicker or distortion.

While the Ready For™ feature does not require a cable or a docking station, many electronic devices do require a physical connection in the form of a display data channel between the source device and the wearable glass projection device for a content redirection feature to work properly. To wit, many standards such as the highly popular and ubiquitous high-definition multimedia interface (HDMI) interface standard require a physical wire be connected between a source device and a display device for content redirection to work. Additionally, even some users of advanced content redirection technologies such as Ready For™ even prefer to use a docking station and/or physical cable to couple their electronic device to a content presentation companion device because a physical cable defining a display data channel invariably offers a more reliable and faster data connection than do most wireless connections. Indeed, coupling a smartphone having Ready For™ capability to a monitor having a defined display size is a quite popular way to view content on a larger display.

For content to be displayed properly, the source device must render the content in accordance with the capabilities of the companion device. With rectangular screens such as televisions and monitors, this is easy as each television or monitor has an inherent display size, with the display being a fixed distance from the light emitting elements that present content, images, and other information on the display. The display size is defined as EDID included in the base EDID structure, thereby allowing a source device to quickly and easily determine how to render content for a connected content presentation companion device.

Such a determination is not as straightforward with a wearable glass projection device. This is true because a wearable glass projection device does not have a physical screen with a defined display size. Instead, a wearable glass projection device such as an augmented reality companion device or a virtual reality companion device will include an image generation device, one example of which is a projector that projects light through one or more lenses for each eye of the wearer. In many cases, this image generation device and corresponding lenses are situated only a few inches from the eyes of a user when the user is wearing the wearable glass projection device. What the user sees is neither related to the physical size of the image generation component or a viewing area that is visible by the user.

Embodiments of the disclosure contemplate that for an optimal user experience, the lenses used with each eye will be situated within the wearable glass projection device so that they correspond to an interpupillary distance of the wearer. As is well-understood by those of ordinary skill in the art, an "interpupillary distance" measures the distance between the centers of the eyes of a person. As related to embodiments of the disclosure, an "interpupillary distance" refers to the positions of the lenses within the wearable glass projection device, with lenses being spaced farther apart having a larger interpupillary distance, while lenses positioned closer together have a smaller interpupillary distance. In one or more embodiments, the interpupillary distance described herein is expressed as a distance between centers of the lenses. In other embodiments, the interpupillary distance is expressed as a default measurement combined with an adjustment measurement per lens.

Embodiments of the disclosure contemplate that that configuring a wearable glass projection device that has a lens interpupillary distance that matches the interpupillary distance of the wearer provides an optimal user experience in that the perception of images is clearer and eye strain is reduced. Moreover, since the lenses focus images from the image generation device at their optical center, by adjusting the interpupillary distance between the lenses, this optical center can be tuned for a particular user so that the user can obtain their most comfortable view. This works to reduce blurred images, dizziness, and eye strain.

Advantageously, embodiments of the disclosure write this interpupillary distance associated with the physical configuration of the lenses of the wearable glass projection device to an EDID extension. The EDID extension is then transmitted to a source device in response to a communication device of the wearable glass projection device detecting establishment of a display data channel with the source device.

The transmission of interpupillary distance information to a source device is advantageous because in current systems, wearable glass projection devices are identified only by their Universal Serial Bus (USB) identifier. Unless a source device understands explicitly how the wearable glass projection device is configured, content cannot be rendered properly. Accordingly, embodiments of the disclosure include a specific interpupillary distance defined by positions of the lenses in a wearable glass projection device in an EDID extension.

In addition to providing interpupillary distance in an EDID extension, embodiments of the disclosure also populate other fields of an EDID file structure with information associated with the wearable glass projection device. Illustrating by example, in one or more embodiments the slice assignments associated with each lens of the wearable glass projection device are written to the EDID file structure as well. Accordingly, embodiments of the disclosure advantageously provide a two-metric "code" that allows an electronic device to quickly, efficiently, and automatically determine the physical configuration of companion device with which it is communicating. Embodiments of the disclosure advantageously allow for backwards compatibility of electronic devices with new wearable glass projection devices.

In one or more embodiments, a wearable glass projection device which is connectable to a source device comprises a projector. Lenses focus images from the projector at an image focus optical scenter that is a function of the interpupillary distance defined by the positions of the lenses in the wearable glass projection device.

The wearable glass projection device also includes one or more processors operable with the projector and a communication device operable with the one or more processors. In one or more embodiments, the one or more processors, in response to the communication device detecting establishment of a display data channel with the source device, create and EDID extension comprising an indication of the interpupillary distance and cause the communication device to transmit the EDID extension to the source device using the display data channel.

Embodiments of the disclosure contemplate that the interpupillary distance can be represented in a variety of ways. Illustrating by example, in one or more embodiments the interpupillary distance is simply a measurement of distance, which can be expressed in inches, millimeters, and so forth. In other embodiments, each wearable glass projection device has a default interpupillary distance. Where this is the case, the interpupillary distance can be represented either as the default interpupillary distance plus an adjustment measurement representing a "plus" or "minus" distance adjustment for each lens.

Embodiments of the disclosure therefore provide a solution enabler that surfaces an interpupillary distance metric for a wearable glass projection device to a source device by delivering an EDID extension to the source device using the display data channel that is established between the source device and the wearable glass projection device. The source device can then easily access this information and properly render content for the wearable glass projection device.

Using logic programmed into the source device, the source device can even distinguish a wearable glass projection device from a projector or monitor since neither a projector nor monitor has an interpupillary distance associated therewith. Embodiments of the disclosure therefore enhance the EDID standard by including an EDID extension that includes an indication of an interpupillary distance of a wearable glass projection device that is in communication with a source device.

Using an augmented reality device as an example, in one or more embodiments an augmented reality device includes an augmented reality presentation device, a communication device, and one or more processors operable with the communication device and the augmented reality presentation device. In one or more embodiments the one or more processors, in response to the communication device establishing a display data channel, cause the communication device to transmit an EDID extension comprising an augmented reality content rendering parameter of the augmented reality presentation device using the display data channel. The augmented reality content rendering parameter can be expressed as an interpupillary distance associated with a physical configuration of the augmented reality device defined by positions of the lenses of the augmented reality device. In one or more embodiments, the one or more processors cause the communication device to transmit an EDID file comprising an EDID extension flag indicating that the EDID extension is included.

Figure 8:
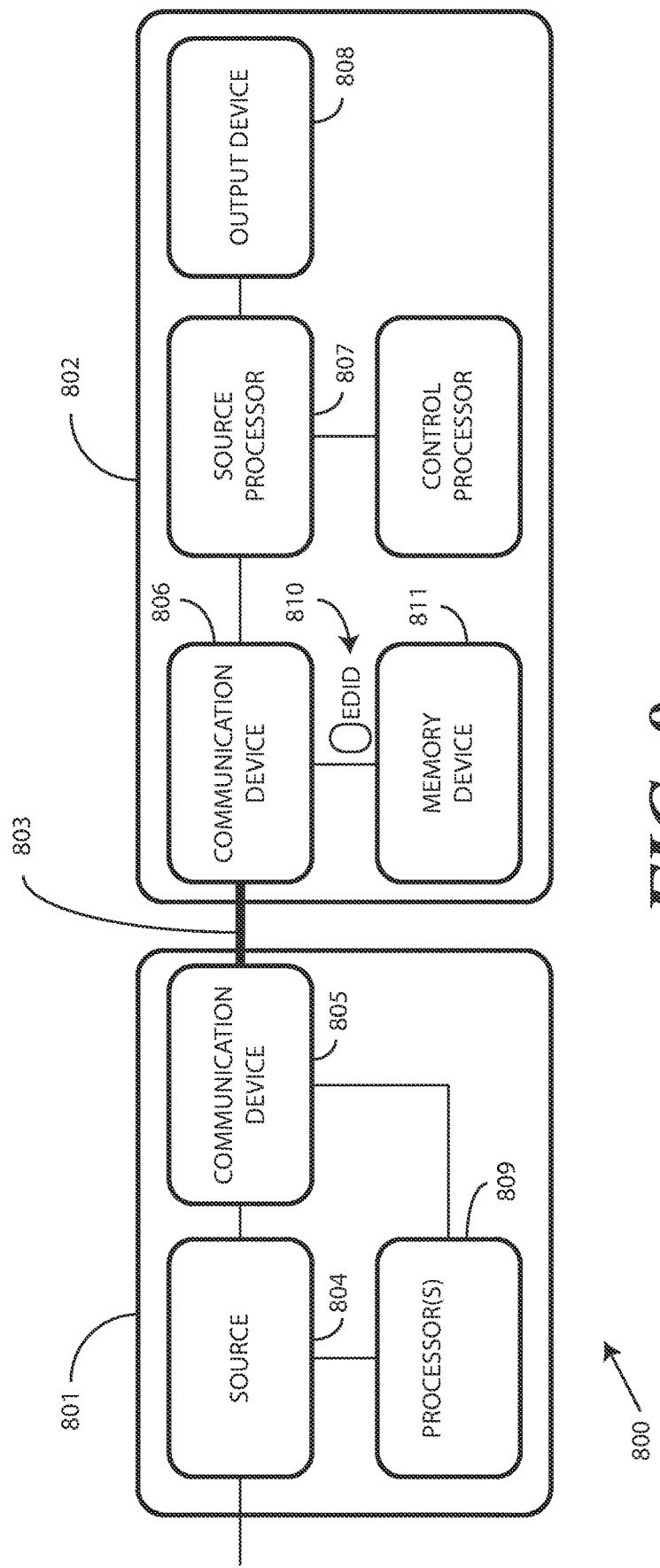
FIG. 8 illustrates a prior art wearable glass projection device.

By way of background, and turning now to FIG. 8, illustrated therein is one prior art image display system 800 that includes a source device 801 coupled to an image display device 802 via a display data channel 803. The display data channel 803 is shown as a wired connection in FIG. 8.

To provide images and sounds to the environment around the image display device system 800, a content source 804 of the source device 801 delivers content (which could be streamed, stored locally, created, or otherwise obtained) to the image display device 802 through a communication device 805.

The image display device 802 then receives that content via its own communication device 806. The image display device 802 then employs a source processor 807 and an output device 808, examples of which include a display and loudspeakers, to deliver the content to the environment.

One or more processors 809 of the source device 801 need to determine what output signals are optimized for the content to be presented on the image display device 802. The source device 801 can do this because the image display device 802 sends an EDID file structure 810 stored in a memory device 811 of the image display device 802. An EDID file structure 810 is a standardized communication protocol that allows an image display device 802 to inform the source device 801 regarding the operating capabilities it possesses. Using the EDID file structure 810, the image display device 802 can inform the source device 801 regarding operating characteristics such as native resolution, display size, aspect ratio, color definition, and other supported features. The EDID file structure 810 can even identify the manufacturer and serial number of the content presentation companion device.

Turning briefly to FIG. 4, illustrated therein is one example of an EDID file structure 810. Communication of the EDID file structure 810 allows a source device to configure the content it delivers to an image display device without the user having to manually configure the same. Additionally, the EDID file structure 810 reduces the chance for the content being transmitted incorrectly from the source device to the image display device. Developed by the Video Electronic Standards Association (VESA), the EDID file structure 810 allows for far more information to be delivered from an image display device to a source device than, for example, having dedicated pins attempt to carry information using binary signals.

The EDID file structure 810 defines a 128-byte data structure that includes manufacturer and operation-related data. As shown in FIG. 4, this information includes a vendor/product identification block, an EDID structure version and revision, basic display parameters (including display size when an image display device has a physical display screen) and features, color characteristics, established timings, standard timing information, and detailed timing descriptions.

While originally 128 bytes, as image display devices became more advanced the EDID file structure 810 was extended so that additional data could be transmitted. Illustrating by example, in December of 2007 the VESA released a second generation of the EDID file structure. This second generation of the EDID file structure allows for the file structure to be of a variable length that can extend up to 256 bytes. However, the base EDID information is carried in the original EDID file structure 810 that is 128 bytes in length. Legacy image display devices cannot use the second generation of the EDID file structure because it is not backwards compatible with the original EDID file structure.

Relevant to embodiments of the present disclosure, the EDID file structure 810 also allows for an extension flag 401. The extension flag 401, when set, indicates that an extension, which is an additional 128-byte block of data, will be included with the EDID file structure 810 to describe increased capabilities. Such an EDID extension is used in accordance with one or more embodiments of the disclosure, as will be explained in more detail below.

Turning now back to FIG. 8, if the source device 801 is a computer and the image display device 802 is a television, the computer would receive the EDID file structure 810 from the television by sending a request for the EDID file structure 810 over the display data channel 803 at startup. The television will then deliver the EDID file structure 810 to the computer. The computer, upon its processors reading the EDID file structure 810, will configure its output image and sound signals to be optimized for the television's display size and sound output capabilities.

As is quite often the case, the EDID file structure 810 of conventional image display devices 802 is stored in a memory device 811 that is non-volatile. Frequently, this EDID file structure 810 is stored in non-volatile memory when the image display device 802 is being manufactured and is stored as a single format.

Consequently, the EDID file structure 810 can be difficult to change or modify on the fly. What's more, the EDID operating standard wholly fails to provide any mechanism for an image display device configured as a wearable glass projection device to inform the source device 801 regarding how content should be rendered for its projection capabilities, be they augmented reality presentation components or virtual reality presentation components. Thus, in addition to the EDID file structure 810 being fixed in many image display devices, it is simply not possible in the prior art image display device system 800 for a wearable glass projection device to tell the source device 801 how to render its content.

Advantageously, embodiments of the disclosure provide a solution to this problem by utilizing the aforementioned extension flag (401) of the EDID file structure 810 to include an EDID extension that identifies an interpupillary distance associated with a physical configuration of a wearable glass projection device. Illustrating by example, in one or more embodiments a wearable glass projection device which is connectable to a source device 801 comprises a projector. Lenses focus images from the projector at an image focus optical center that is a function of an interpupillary distance defined by positions of the lenses within the wearable glass projection device. One or more processors are operable with the projector, and a communication device is operable with the one or more processors.

In one or more embodiments, the one or more processors, in response to the communication device detecting establishment of a display data channel with the source device 801, create an EDID extension comprising an indication of the interpupillary distance. The one or more processors then cause the communication device to transmit the EDID extension to the source device using the display data channel.

In one or more embodiments, the indication of the interpupillary distance is expressed as a distance measurement. For instance, the interpupillary distance can be measured in millimeters. In other embodiments, the interpupillary distance is expressed as a default measurement associated with a wearable glass projection device combined with an adjustment measurement provided on a per-lens basis. If the default measurement were five centimeters, for example, an adjustment measurement for the right lens might be plus two millimeters while an adjustment measurement for the left lens might be minus three millimeters, and so forth.

In one or more embodiments, the one or more processors, in response to the communication device receiving an EDID request, cause the communication device to transmit an EDID file to the source device 801. In one or more embodiments, slice assignments (402) for each lens of the wearable glass projection device are written to the EDID file structure (810) as well. However, the one or more processors also cause the communication device to transmit the EDID extension with the EDID file in response to the EDID request. As noted, the EDID extension includes the indication of the interpupillary distance, be it represented as a singular distance or a default distance with adjustment measurements for the interpupillary distance or each lens on a per lens basis.

In one or more embodiments, the one or more processors of the wearable glass projection device alert the source device to the fact that the EDID extension is included by transmitting an EDID file structure having an EDID extension flag set. Thus, the wearable glass projection device can inform the source device as to exactly how to render content for proper presentation by the wearable glass projection device.

Turning now to FIG. 1, illustrated therein is one explanatory wearable glass projection device 100 configured in accordance with one or more embodiments of the disclosure. The wearable glass projection device 100 of FIG. 1 is an augmented reality companion device configured to operate in conjunction with a source device (801) to provide augmented reality content to a user. While the wearable glass projection device 100 of FIG. 1 is shown as being an augmented reality companion device for explanatory purposes, wearable glass projection devices configured in accordance with embodiments of the disclosure can take other forms as well. Illustrating by example, as will be discussed in more detail below with reference to FIG. 2, in other embodiments a wearable glass projection device can be configured as a virtual reality companion device.

The wearable glass projection device 100 of FIG. 1 is shown illustratively as being augmented reality glasses. However, it should be noted that the wearable glass projection device 100 could be configured in any number of other ways as well. Illustrating by example, the wearable glass projection device 100 could also be configured as any of sunglasses, goggles, masks, shields, or visors. Other forms of the wearable glass projection device 100 will be obvious to those of ordinary skill in the art having the benefit of this disclosure.

The wearable glass projection device 100 of FIG. 1 includes a frame 101 and one or more stems 102,103. Here, the one or more stems 102,103 comprise a first stem 102 and a second stem 103.

One or more lenses 104,105 can be disposed within the frame 101. The lenses 104,105 can be prescription or non-prescription, and can be clear, tinted, or dark.

In one or more embodiments, the lenses 104,105 define an interpupillary distance 128. This interpupillary distance 128 defines how the lenses 104,105 focus images from an augmented reality projection device projector 122 at an image focus optical center 130. In one or more embodiments, an adjustment device 129 can be manipulated to move the lenses 104,105 farther apart, thereby increasing the interpupillary distance 128, or closer together, thereby decreasing the interpupillary distance 128.

In one or more embodiments the stems 102,103 are pivotable from a first position where they are situated adjacent to, and parallel with, the frame 101, to a second, radially displaced open position shown in FIG. 1. However, in other embodiments the stems 102,103 may be fixed relative to the frame 101. In still other embodiments, such as might be the case if the wearable glass projection device 100 were configured as goggles, the stems 102,103 may be flexible or soft. For example, the stems of goggles are frequently elasticized fabric, which is soft, flexible, pliable, and stretchy. Other types of stems 102,103 will be obvious to those of ordinary skill in the art having the benefit of this disclosure.

In one or more embodiments the stems 102,103 attach to the frame 101 at a first end 108,109 and extend distally from the frame 101 to a second, distal end 110,126. In one embodiment, each stem 102,103 includes a temple portion 106 and an ear engagement portion 107. The temple portion 106 is the portion of the stem 102,103 passing from the frame 101 past the temple of a wearer, while the ear engagement portion 107 engages the wearer's ear to retain the augmented reality glasses to the wearer's head.

Since the wearable glass projection device 100 is configured as an electronic device, one or both of the frame 101 and the stems 102,103 can comprise one or more electrical components. These electrical components are shown illustratively in a schematic block diagram 125 in FIG. 1. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 111. The one or more processors 111 can be disposed in one (or both) of the stems 102,103 and/or the frame 101. The one or more processors 111 can be operable with a memory 112. The one or more processors 111, which may be any of one or more microprocessors, programmable logic, application specific integrated circuit device, or other similar device, are capable of executing program instructions and methods described herein. The program instructions and methods may be stored either on-board in the one or more processors 111, or in the memory 112, or in other computer readable media coupled to the one or more processors 111.

The one or more processors 111 can be configured to operate the various functions of the wearable glass projection device 100, and also to execute software or firmware applications and modules that can be stored in a computer readable medium, such as memory 112. The one or more processors 111 execute this software or firmware, in part, to provide device functionality. The memory 112 may include either or both static and dynamic memory components, may be used for storing both embedded code and user data.

In one or more embodiments, the wearable glass projection device 100 also includes an optional wireless communication device 113. Where included, the wireless communication device 113 is operable with the one or more processors 111 and is used to facilitate electronic communication with one or more electronic devices or servers or other communication devices across a network. Note that it is possible to combine the one or more processors 111, the memory 112, and the wireless communication device 113 into a single device, or alternatively into devices having fewer parts while retaining the functionality of the constituent parts.

The wireless communication device 113, which may be one of a receiver or transmitter and may alternatively be a transceiver, operates in conjunction with the one or more processors 111 to electronically communicate through a communication network. For example, in one embodiment, the wireless communication device 113 can be configured to communicate through a traditional cellular network. Other examples of networks with which the communication circuit may communicate include proprietary networks and direct communication networks. In other embodiments, the wireless communication device 113 can communicate with near field or local area networks, infrared communication circuits, magnetic field modulation circuits, and Wi-Fi circuits. In one or more embodiments, the wireless communication device 113 can be configured to provide messaging functionality to deliver electronic messages to remote devices.

A battery 114 or other energy storage device can be included to provide power for the various components of the wearable glass projection device 100. While a battery 114 is shown in FIG. 1, it will be obvious to those of ordinary skill in the art having the benefit of this disclosure that other energy storage devices can be used instead of the battery 114, including a micro fuel cell or an electrochemical capacitor. The battery 114 can include a lithium-ion cell, lithium polymer cell, or a nickel metal hydride cell, such cells having sufficient energy capacity, wide operating temperature range, large number of charging cycles, and long useful life. The battery 114 may also include overvoltage and overcurrent protection and charging circuitry. In one embodiment, the battery 114 comprises a small, lithium polymer cell.

In one or more embodiments, a photovoltaic device 115, such as a solar cell, can be included to recharge the battery 114. In one embodiment, the photovoltaic device 115 can be disposed along the temple portion 106 of the stems 102,103. In this illustrative embodiment, two solar cells are disposed in the temple portion 106 of each stem 102,103, respectively.

Other components 116 can be optionally included in the wearable glass projection device 100 as well. For example, in one embodiment one or more microphones can be included as audio capture devices 117. These audio capture devices can be operable with the one or more processors 111 to receive voice input. Additionally, in one or more embodiments the audio capture devices 117 can capture ambient audio noise. Signals corresponding to captured audio can be transmitted to an electronic device in communication with the wearable glass projection device 100 or a server or cloud-computing device. The other component 116 can additionally include loudspeakers for delivering audio content to a user wearing the wearable glass projection device 100.

The other components 116 can also include a motion generation device for providing haptic notifications or vibration notifications to a user. For example, a piezoelectric transducer, rotational motor, or other electromechanical device can be configured to impart a force or vibration upon the temple portion 106 of the stems 102,103, or alternatively along the frame 101. The motion generation device can provide a thump, bump, vibration, or other physical sensation to the user. The one or more processors 111 can be configured to actuate the motion generation device to deliver a tactile or vibration output alone or in combination with other outputs such as audible outputs.

Similarly, in one or more embodiments the wearable glass projection device 100 can include a video capture device such as an imager. The imager can be disposed within the frame 101 or stems 102,103. In one or more embodiments, the video capture device can function as a to detect changes in optical intensity, color, light, or shadow in the near vicinity of the wearable glass projection device 100. As with the audio capture device 117, captured video information can be transmitted to an electronic device, a remote server, or cloud-computing device.

Other sensors 119 can be optionally included in the wearable glass projection device 100. One example of such a sensor is a global positioning system device for determining where the wearable glass projection device 100 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other sensors 119 can also include an optional user interface. The user interface can be used, for example, to activate the circuit components or turn them OFF, control sensitivity of the other sensors 119, and so forth. The user interface, where included, can be operable with the one or more processors 111 to deliver information to, and receive information from, a user. The user interface can include a rocker switch, slider pad, button, touch-sensitive surface, or other controls, and optionally a voice command interface. These various components can be integrated together.

In one or more embodiments, an audio output device 120, such as a loudspeaker or other transducer, can deliver audio output to a user. For example, piezoelectric transducers can be operably disposed within the stems 102,103. Actuation of the piezoelectric transducers can cause the stems 102,103 to vibrate, thereby emitting acoustic output. More traditional audio output devices 120, such as loudspeakers, can be used as well.

The other components 116 can optionally include a haptic device providing haptic feedback to a user. The haptic device can include a motion generation device to deliver a tactile response to the user. For example, a piezoelectric transducer or other electromechanical device can be included in the stems 102,103. The transducer can actuate to impart a force upon the user's head to provide a thump, bump, vibration, or other physical sensation to the user. The inclusion of both the audio output device 120 and the haptic device allows both audible and tactile feedback to be delivered.

In one or more embodiments, the wearable glass projection device 100 includes an augmented reality image presentation device 121 operable to deliver augmented reality imagery to a user. The augmented reality image presentation device 121 can be operable with a projector 122.

Embodiments of the disclosure contemplate that for an optimal user experience, the lenses 104,105 used with each eye will be situated within the wearable glass projection device 100 so that they correspond to an interpupillary distance of the wearer. Embodiments of the disclosure contemplate that that configuring a wearable glass projection device 100 that has an interpupillary distance 128 associated with the physical configuration of the wearable glass projection device 100 defined by the position of the lenses 104,105 that matches the interpupillary distance of the wearer provides an optimal user experience in that the perception of images at the image focus optical center 130 is clearer, thereby reducing eye strain is reduced. Moreover, since the lenses 104,105 focus images from the projector 122 at the image focus optical center 130, by adjusting the interpupillary distance 128 between the lenses 104,105, this image focus optical center 130 can be tuned for a particular user so that the user can obtain their most comfortable view. This works to reduce blurred images, dizziness, and eye strain.

Advantageously, embodiments of the disclosure write this interpupillary distance 128 associated with the physical configuration of the lenses 104,105 of the wearable glass projection device 100 to an EDID extension 127. The EDID extension 127 is then transmitted to a source device in response to a communication device 113 of the wearable glass projection device 100 detecting establishment of a display data channel with the source device.

In addition to providing interpupillary distance 128 in an EDID extension 127, embodiments of the disclosure also populate other fields of an EDID file structure 810 with information associated with the wearable glass projection device 100. Illustrating by example, in one or more embodiments the slice assignments associated with each lens 104, 105 of the wearable glass projection device 100 are written to the EDID file structure 810 as well. Accordingly, embodiments of the disclosure advantageously provide a two-metric "code" that allows a source device to quickly, efficiently, and automatically determine the physical configuration of the wearable glass projection device 100 with which it is communicating. Embodiments of the disclosure advantageously allow for backwards compatibility of electronic devices with new wearable glass projection devices.

Embodiments of the disclosure contemplate that the interpupillary distance 128 can be represented in a variety of ways. Illustrating by example, in one or more embodiments the interpupillary distance 128 is simply a measurement of distance, which can be expressed in inches, millimeters, and so forth. In other embodiments, the augmented reality device 100 has a default interpupillary distance 128 associated therewith. Where this is the case, the interpupillary distance can be represented either as the default interpupillary distance 128 plus an adjustment measurement representing a "plus" or "minus" distance adjustment for each lens 104, 105.

Embodiments of the disclosure therefore provide a solution enabler that surfaces an interpupillary distance metric for a wearable glass projection device to a source device by delivering an EDID extension 127 to the source device using the display data channel that is established between the source device and the wearable glass projection device. The source device can then easily access this information and properly render content for the wearable glass projection device. Using logic programmed into the source device, the source device can even distinguish a wearable glass projection device from a projector or monitor since neither a projector nor monitor has an interpupillary distance 128 associated therewith. Embodiments of the disclosure therefore enhance the EDID standard by including an EDID extension 127 that includes an indication of an interpupillary distance 128 of a wearable glass projection device that is in communication with a source device.

In the illustrative embodiment of FIG. 1, the frame 101 supports the projector 122. In one or more embodiments the projector 122 is configured to deliver images to a holographic optical element when the wearable glass projection device 100 is operating in an augmented reality mode of operation.

In one embodiment, the projector 122 is a modulated light projector operable to project modulated light images along a surface or holographic optical element. In another embodiment, the projector 122 is a thin micro projector. In another embodiment, the projector 122 can comprise a laser projector display module. Other types of projectors will be obvious to those of ordinary skill in the art having the benefit of this disclosure.

In one or more embodiments, the projector 122 can include a lens and a spatial light modulator configured to manipulate light to produce images. The projector 122 can include a light source, such as a single white light emitting diode, multiple separate color light emitting diodes, or multiple separate color laser diodes that deliver visible light to the spatial light modulator through a color combiner. The augmented reality image presentation device 121 can drive the spatial light modulator to modulate the light to produce images. The spatial light modulator can be optically coupled (e.g., by free space propagation) to the lens and/or a beam steerer. Where used, a beam steerer serves to steer a spatially modulated light beam emanating from the spatial light modulator through the lens to create images.

In one or more embodiments, for a given augmented reality image presentation device 121 design, the interpupillary distance 128 can be detected by the one or more sensors 119 of the wearable glass projection device 100 when the adjustment device 129 is manipulated. This interpupillary distance 129 can then be stored in an EDID extension 127 that is stored in the memory 112 and that can be delivered with an EDID file structure 810 to a source device (801) via the communication device 113, either automatically or in response to queries from the source device (801). This is advantageous because when the source device (801) is delivering rendered content for presentation by the augmented reality image presentation device 121, this content can be rendered in accordance with a specified interpupillary distance 128 for proper presentation.

For this reason, embodiments of the disclosure advantageously include the interpupillary distance metric in an EDID extension 127 stored in the memory 112 of the wearable glass projection device 100. Not only does the interpupillary distance metric allow the source device (801) to properly format content for presentation by the augmented reality image presentation device 121, but it can also allow identification logic in the source device (801) to determine that the augmented reality device of FIG. 1 is indeed a wearable glass projection device. In one or more embodiments, this determination is made any time the interpupillary distance 128 is set in the EDID extension 127.

Turning briefly to FIG. 5, illustrated therein is one explanatory EDID extension 127 in accordance with one or more embodiments of the disclosure. As shown, the EDID extension 127 includes a payload field 501 comprising a wearable glass projection device rendering parameter 502. Where the wearable glass projection device is an augmented reality device, the wearable glass projection device rendering parameter 502 comprises an augmented reality content rendering parameter. Similarly, where the wearable glass projection device comprises a virtual reality device, the wearable glass projection device rendering parameter 502 comprises a virtual reality content rendering parameter.

In one or more embodiments, the wearable glass projection device rendering parameter 502 comprises an interpupillary distance 128 associated with a physical configuration of the wearable glass projection device. Illustrating by example, in one or more embodiments the interpupillary distance 128 can be defined by positions of lenses within the wearable glass projection device.

In one or more embodiments, the interpupillary distance 128 is expressed as a distance measurement. In other embodiments, the interpupillary distance is expressed as a default measurement combined with an adjustment measurement. In one or more embodiments, this adjustment measurement can be provided on a per-lens basis.

In one or more embodiments, the EDID extension 127 is configured to define advanced capabilities of the wearable glass projection device (100) of FIG. 1, including identifying a metric that a source device (801) can use to properly rendering content. Using the payload field 501, one or more processors (111) of the wearable glass projection device (100) can write an indication of the interpupillary distance 128 to the EDID extension 127 and can cause the communication device (113) of the wearable glass projection device (100) to transmit the EDID extension 127. In one or more embodiments, the communication device (113) transmits the EDID extension 127 in response to the communication device (113) detecting the establishment of the display data channel with a source device (801). This is in contrast to prior art systems where an EDID file structure (810) will be transmitted in response to source device requests.

The use of an EDID extension 127 to transmit the interpupillary distance 128 associated with a wearable glass projection device advantageously allows legacy devices and new devices alike to properly render content for a wearable glass projection device. Even wearable glass projection devices that are not capable of utilizing the second generation of the EDID file structure can still identify the port to which a source device is connected simply by setting the EDID extension flag (401) in the EDID file structure (810) and including the EDID extension 127 with the EDID file structure (810).

However, it should be understood that embodiments of the disclosure are not limited to solely using the EDID extension 127 in a wearable glass projection device to identify the wearable glass projection device content presentation parameter 502. In wearable glass projection devices that do support the second generation of the EDID file structure, rather than using the EDID extension 127, the second generation of the EDID file structure can simply be extended to include the payload field 501 comprising the wearable glass projection device content rendering parameter as well.

Thus, in other embodiments of the disclosure, one or more processors (111) of a wearable glass projection device (100), in response to a communication device (113) detecting establishment of a display data channel with a source device (801), create a second generation of the EDID file structure comprising the wearable glass projection device content rendering parameter 50. The one or more processors (111) then cause the communication device (113) to transmit the second generation of the EDID file structure comprising the wearable glass projection device content rendering parameter 502 using the display data channel.

Turning now back to FIG. 1, in one or more embodiments the wearable glass projection device 100 includes a companion device display integration manager 124. The companion device display integration manager 124 can be used to communicate with a companion electronic device, one example of which is the source device (801) of FIG. 8.

Illustrating by example, in one or more embodiments the wearable glass projection device 100 comes in different sizes. Embodiments of the disclosure contemplate that even when no adjustment device 129 is included the size of the wearable glass projection device 100 will alter the interpupillary distance 128. Accordingly, the companion device display integration manager 124 may provide size, interpupillary distance 128, user profile, or other information associated with the wearable glass projection device 100 to the other electronic device using the communication device 113 in response to queries or requests.

Additionally, when the source device (801) transmits content, event notifications, subtitles, or other contextual information to the wearable glass projection device 100, the companion device display integration manager 124 can deliver that information to the augmented reality image presentation device 121 for presentation to the user as an augmented reality experience via the projector 122.

The wearable glass projection device 100 of FIG. 1 can operate as a stand-alone electronic device in one or more embodiments. However, in other embodiments, the wearable glass projection device 100 can operate in tandem with an electronic device, via wireless electronic communication using the wireless communication device 113 or via a wired connection channel 123 to form an augmented reality system.

The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the wearable glass projection device 100. Other circuitry structures for content presentation companion devices configured in accordance with embodiments of the disclosure will be obvious to those of ordinary skill in the art having the benefit of this disclosure.

In one or more embodiments, a source device (801) establishing a display data channel with the communication device 113 can query the communication device for an EDID file structure 810 and EDID extension 127. Illustrating by example, in one or more embodiments a port querying/identification manager of a source device (801) can query the wearable glass projection device 100 for the EDID extension 127 identifying the wearable glass projection device content rendering parameter (502). In one or more embodiments, the one or more processors 111 of the wearable glass projection device 100, in response to receiving such an EDID request, cause the communication device 113 to transmit the EDID file structure 810 and EDID extension 127 to the source device (801). In one or more embodiments, the one or more processors 111 further, in response to the communication device 113 detecting establishment of the display data channel with the source device (801), set an EDID extension flag (401) in the EDID file structure 810 to let the source device know that an EDID extension 127 is being transmitted with the EDID file structure 810 as well.

It is to be understood that FIG. 1 is provided for illustrative purposes only and for illustrating components of one wearable glass projection device 100 in accordance with embodiments of the disclosure and is not intended to be a complete schematic diagram of the various components required for an electronic device operating as a wearable glass projection device. Therefore, other electronic devices configured in accordance with embodiments of the disclosure may include various other components not shown in FIG. 1 or may include a combination of two or more components or a division of a particular component into two or more separate components, and still be within the scope of the present disclosure.

Figure 2:
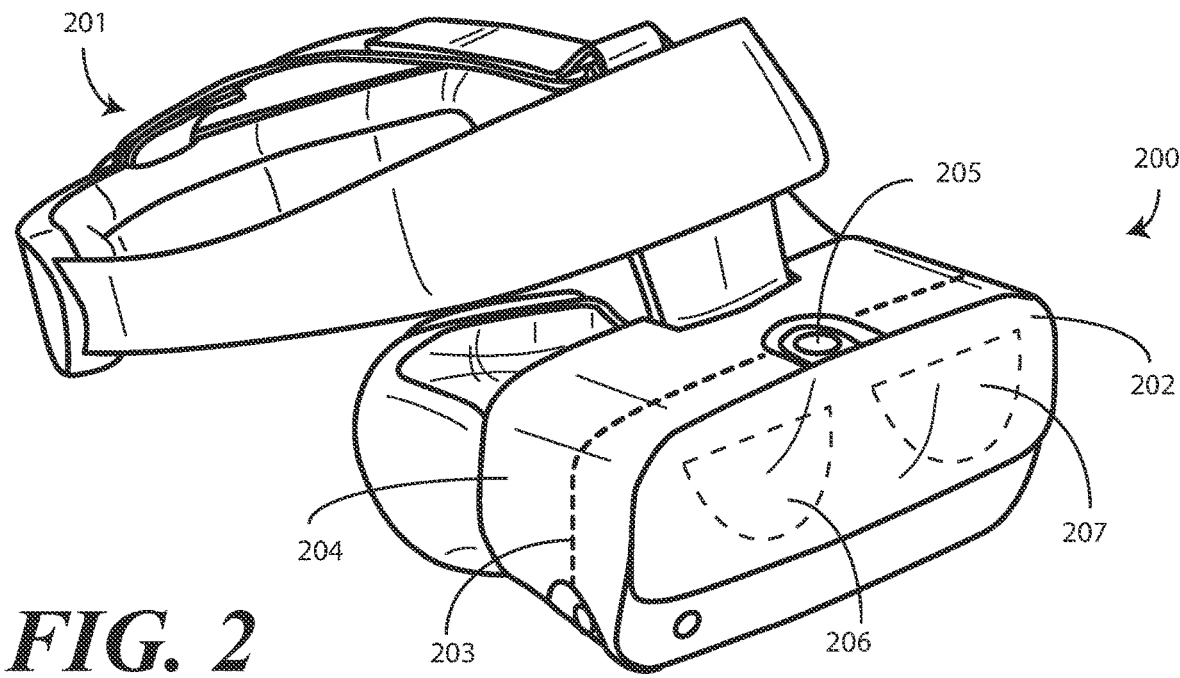
FIG. 2 illustrates another wearable glass projection device in accordance with one or more embodiments of the disclosure.

To this point, the explanatory wearable glass projection device 100 of FIG. 1 has been described as being an augmented reality companion device. However, embodiments are not so limited. Indeed, the interpupillary distance metric found in the EDID extension 127 can be used to render content for a virtual reality companion device as well. Turning now to FIG. 2, illustrated therein is one such virtual reality companion device.

While the wearable glass projection device (100) of FIG. 1 was an augmented reality companion device, the wearable glass projection device 200 of FIG. 2 is a "virtual" reality companion device. As with the augmented reality companion device of FIG. 1, the virtual reality companion device of FIG. 2 is configured as a headwear device that can be worn by a user.

In this illustrative embodiment, the wearable glass projection device 200 includes a head receiver 201. The head receiver 201 is to receive a user's head. When the user desires to don the wearable glass projection device 200, they place their head into the head receiver 201. The head receiver 201 can be adjustable to accommodate different sizes of heads. While the head receiver 201 is shown illustratively as a headband and overhead strap combination, it can take other forms as well, including structural shapes such as a cap, hat, helmet, or other head-covering device.

The wearable glass projection device 200 also includes a shield 202 to block light from entering a virtual reality cabin positioned around the eyes of a wearer. In one or more embodiments, a virtual reality display is positioned behind this shield 202. In one embodiment, the shield 202 is manufactured from an opaque material, such as an opaque thermoplastic material.

In this illustrative embodiment, the shield 202 is coupled directly to the head receiver 201. However, other configurations will be obvious to those of ordinary skill in the art having the benefit of this disclosure. Illustrating by example, the shield 202 can be pivotally coupled to the head receiver 201 such that it can be moved between a first position relative to the head receiver 201 and a second position that is angularly displaced about the head receiver 201 relative to the first position. In still other embodiments, the shield 202 can be coupled to the head receiver 201 by way of a track.

Other configurations and coupling schemes will be obvious to those of ordinary skill in the art having the benefit of this disclosure.

In one or more embodiments, a holographic optical element 203 is positioned within the virtual reality cabin positioned around the user's eyes. In one or more embodiments, the holographic optical element 203 is translucent such that ambient light can pass therethrough. The holographic optical element 203 can be any of a lens, filter, beam splitter, diffraction grating, or other device capable of reflecting light received along the interior of the virtual reality cabin to create holographic images. In one illustrative embodiment, the holographic optical element 203 comprises a pellucid holographic lens that is either integral to, or coupled to, the shield 202. Other examples of holographic optical elements will be obvious to those of ordinary skill in the art having the benefit of this disclosure.

Electronic components, many of which were described with reference to the block diagram schematic (125) of FIG. 1, can be integrated into wearable glass projection device 200. Accordingly, in such embodiments the wearable glass projection device 200 can include a display and corresponding electronics or alternatively a pair of displays, e.g., a left display and a right display. The display can optionally include a projector as previously described. Where a single display is used, it can of course present multiple images to the user at the same time (one for each eye). To provide a richer virtual reality experience, different information or content can be delivered to each of the user's eyes.

In one or more embodiments, the virtual reality cabin also includes one or more optical lenses situated therein. In one or more embodiments, the one or more optical lenses can bend light to make it easier for the user's eyes to see. Additionally, where multiple images are presented to the user at the same time, the one or more optical lenses 206,207 can help segregate this content so that the proper content reaches the proper eye without interference from content intended for the other eye. In one embodiment, the one or more optical lenses 206,207 comprise Fresnel lenses. In another embodiment, the one or more optical lenses 206,207 comprise hybrid Fresnel lenses. Other types of lenses will be obvious to those of ordinary skill in the art having the benefit of this disclosure. An adjustment device 205 can be used to adjust the distance between the one or more optical lenses 206,207, thereby changing the interpupillary distance as previously described.

In one or more embodiments, a virtual reality cabin perimeter material 204 extends distally from the shield 202 to prevent ambient light from passing to the eyes of a user. This material works to ensure that the minimum quantity of exterior light reaches the user's eyes when operating as a virtual reality headset. The material can also work to improve the user experience by reducing noise introduced by ambient light interfering with the images presented by the display of the wearable glass projection device 200. Moreover, the display of the wearable glass projection device 200 can operate at a lower brightness, thereby conserving power when the material is in place. The material can optionally be detachable for cleaning or other operations.

The wearable glass projection device 200 can optionally include integrated electronics as well. Accordingly, the head receiver 201 or another part of the wearable glass projection device 200 can comprise one or more electrical components. Some of these electrical components were described above in FIG. 1. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors (111). The one or more processors (111) can be operable with a memory (112). The one or more processors (111), which may be any of one or more microprocessors, programmable logic, application specific integrated circuit device, or other similar device, are capable of executing program instructions and methods. The program instructions and methods may be stored either on-board in the one or more processors (111), or in the memory (112), or in other computer readable media coupled to the one or more processors (111).

In one or more embodiments, the wearable glass projection device 200 also includes an optional wireless communication device (113). Where included, the wireless communication device (113) is operable with the one or more processors (111) and is used to facilitate electronic communication with one or more electronic devices or servers or other communication devices across a network. Note that it is possible to combine the one or more processors (111), the memory (112), and the wireless communication device (113) into a single device, or alternatively into devices having fewer parts while retaining the functionality of the constituent parts.

A battery or other energy storage device can be included to provide power for the various components of the wearable glass projection device 200. Again, it will be obvious to those of ordinary skill in the art having the benefit of this disclosure that other energy storage devices can be used instead of the battery, including a micro fuel cell or an electrochemical capacitor. The battery can include a lithium-ion cell or a nickel metal hydride cell, such cells having sufficient energy capacity, wide operating temperature range, large number of charging cycles, and long useful life. The battery may also include overvoltage and overcurrent protection and charging circuitry. In one embodiment, the battery comprises a small, lithium polymer cell.

Other components (116) can be optionally included in the wearable glass projection device 200 as well. For example, in one embodiment one or more microphones can be included as audio capture devices. These audio capture devices can be operable with the one or more processors (111) to receive voice input. Additionally, in one or more embodiments the audio capture device can capture ambient audio noise and cancel it out. In one or more embodiments, the audio capture device can record audio to the memory (112) for transmission through the wireless communication device (113) to a server complex across a network.

The other components (116) can also include a motion generation device for providing haptic notifications or vibration notifications to a user. For example, a piezoelectric transducer, rotational motor, or other electromechanical device can be configured to impart a force or vibration upon the head receiver 201. The motion generation device can provide a thump, bump, vibration, or other physical sensation to the user. The one or more processors (111) can be configured to actuate the motion generation device to deliver a tactile or vibration output alone or in combination with other outputs such as audible outputs.

Similarly, in one or more embodiments the eyewear can include a video capture device such as an imager. In one or more embodiments, the video capture device can function as a to detect changes in optical intensity, color, light, or shadow in the near vicinity of the wearable glass projection device 200. Other optional components include a global positioning system device for determining where the wearable glass projection device 200 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

In one or more embodiments, an audio output device (120), such as a loudspeaker or other transducer, can deliver audio output to a user. For example, piezoelectric transducers can be operably disposed within the head receiver. Actuation of the piezoelectric transducers can cause the same to vibrate, thereby emitting acoustic output. More traditional audio output devices (117), such as loudspeakers, can be used as well.

Sensor circuits of the wearable glass projection device 200 can also include motion detectors, such as one or more accelerometers, gyroscopes, magnetometers, and/or inertial motion units. For example, an accelerometer may be used to show vertical orientation, constant tilt and/or whether the wearable glass projection device 200 is stationary. A gyroscope can be used in a similar fashion.

The motion detectors can also be used to determine the spatial orientation of the wearable glass projection device 200 as well in three-dimensional space by detecting a gravitational direction. In addition to, or instead of, an accelerometer and/or gyroscope, an electronic compass can be included to detect the spatial orientation of the wearable glass projection device 200 relative to the earth's magnetic field. Similarly, the gyroscope can be included to detect rotational motion of the wearable glass projection device 200 in three-dimensional space.

The wearable glass projection device 200 of FIG. 2 can operate as a stand-alone electronic device in one or more embodiments, such as when it includes a display and other corresponding electronic components as noted above. However, in other embodiments, the wearable glass projection device 200 can operate in tandem with a portable electronic device, such as a smartphone or computer, to form a combined headwear/eyewear system.

The distinction between the wearable glass projection device (100) of FIG. 1 and the wearable glass projection device 200 of FIG. 2 is that the wearable glass projection device 200 of FIG. 2 presents images to a user's eyes solely using components of the wearable glass projection device 200 and without the addition of light from the physical environment. However, the components of the wearable glass projection device 200 still have a interpupillary distance associated therewith. Consequently an electronic device in communication with the wearable glass projection device 200 can render content using the interpupillary distance as previously described.

Figure 3:
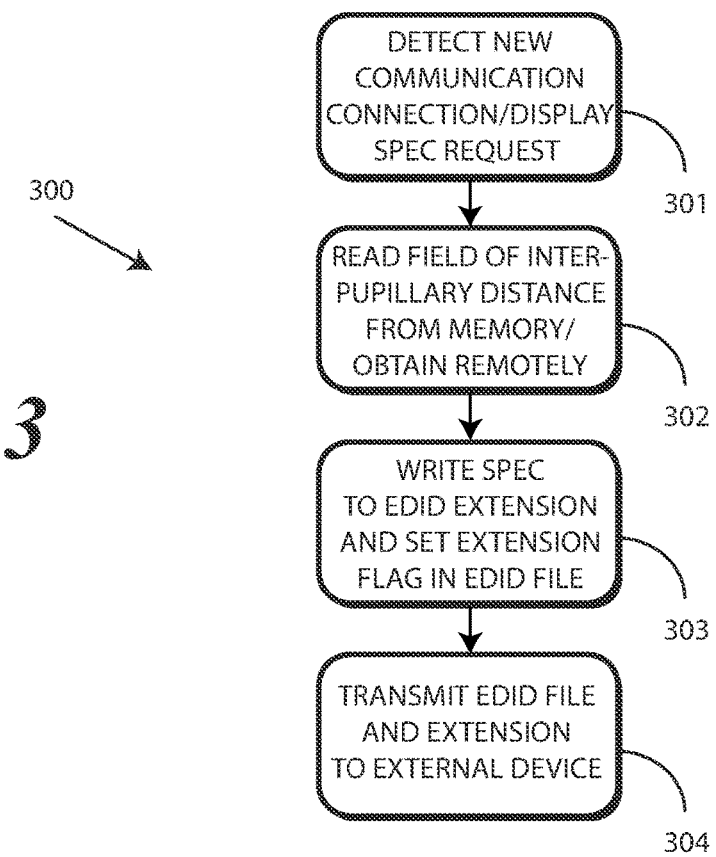
FIG. 3 illustrates one explanatory method in accordance with one or more embodiments of the disclosure.

Turning now to FIG. 3, illustrated therein is one explanatory method 300 in accordance with one or more embodiments of the disclosure. The method 300 of FIG. 3 summarizes the functions of communicating a wearable glass projection device content rendering parameter. The method 300 is suitable for operation in the wearable glass projection device (100) of FIG. 1 or the wearable glass projection device (200) of FIG. 2.

Beginning at step 301, the method 300 detects, with a communication device, a source device establishing a display data channel with a communication device of a wearable glass projection device. In one or more embodiments, step 301 comprises detecting wireless communication between the source device and the wearable glass projection device.

This allows for an automatic execution of the method 300 when a display data channel is established between a source device and a wearable glass projection device. However, in other embodiments step 301 can comprise receiving, with a communication device, an EDID file request. The steps that follow are the same but represent a source device-initiated execution of the method 300 that is an alternative to the automatic execution that occurs in response to establishment of a display data channel.

Step 302 then determines, with one or more processors, and optionally in response to the communication device detecting establishment of the display data channel with the source device, a wearable glass projection device content rendering parameter. Where the wearable glass projection device is an augmented reality device, the wearable glass projection device content rendering parameter can comprise an augmented reality content rendering parameter. Where the wearable glass projection device is a virtual reality device, the wearable glass projection device content rendering parameter can comprise a virtual reality content rendering parameter.

In one or more embodiments, the wearable glass projection device content rendering parameter comprises an interpupillary distance. The interpupillary distance can be expressed as a distance measurement, a default measurement combined with an adjustment measurement, a default measurement combined with an adjustment measurement per lens, or as at least one adjustment from a default interpupillary distance. Other methods for representing the interpupillary distance will be obvious to those of ordinary skill in the art having the benefit of this disclosure.

At step 303, the method 300 comprises writing, with one or more processors, the wearable glass projection device content rendering parameter to an EDID extension. In one or more embodiments, this step 303 also comprises setting, with one or more processors in an EDID file structure, an EDID extension flag. In one or more embodiments, step 303 also comprises setting a display size of an EDID file structure to zero.

Step 304 then comprises transmitting, using the communication device, the EDID extension using the display data channel. In one or more embodiments, this step 304 occurs in response to the communication device of the wearable glass projection device receiving an EDID request. In other embodiments, step 304 occurs automatically in response to the communication device detecting establishment of the display data channel with the source device.

In one or more embodiments, this step 304 also comprises transmitting the EDID file structure with the EDID extension. Where the method 300 is initiated with establishment of a display data channel, step 304 comprises transmitting the EDID extension using the display data channel in response to the communication device detecting establishment of the display data channel. By contrast, where step 301 comprises receiving an EDID file request, step 304 can comprise the communication device transmitting the EDID file structure and EDID extension in response to the EDID file request, and so forth.

Figure 6:
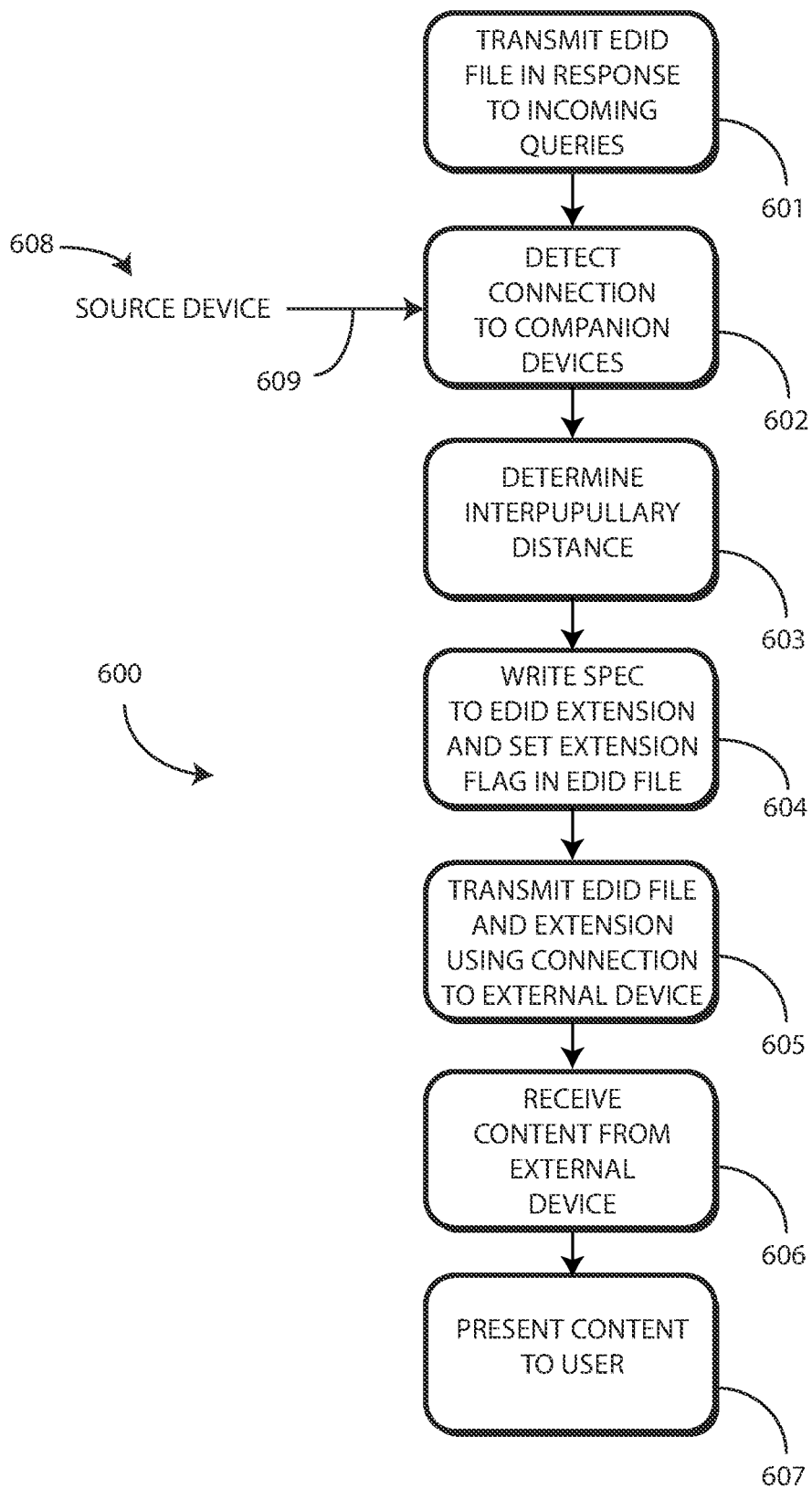
FIG. 6 illustrates another explanatory method in accordance with one or more embodiments of the disclosure.

Turning now to FIG. 6, illustrated therein is an alternate method 600 in accordance with one or more embodiments of the disclosure. Beginning at step 601, in one or more embodiments the method 600 transmits an EDID file structure in response to incoming queries. Illustrating by example, where an EDID file request is received, in one or more embodiments step 601 comprises transmitting, with a communication device, an EDID file structure in response to the EDID file request to a remote electronic device making the request.

At step 602, the method 600 monitors a communication device to determine whether a source device 608 establishes a display data channel 609 with the communication device. In one or more embodiments, this step 602 comprises detecting wireless communication between the source device 608 and the communication device, as previously described.

Step 603 then comprises determining a wearable glass projection device content rendering parameter. Examples of a content rendering parameter include an interpupillary distance, slicing assignments for lenses of the wearable glass projection device, or other wearable glass projection device specific content rendering parameters. The content rendering parameter may be associated with an augmented reality device as an augmented reality content rendering parameter or a virtual reality device as a virtual reality content rendering parameter.

At step 604, the method 600 writes the wearable glass projection device content rendering parameter to either an EDID extension or a second-generation EDID file structure. As noted above, the use of an EDID extension advantageously allows legacy devices and new devices alike to identify the content rendering parameter. Even wearable glass projection devices that are not capable of utilizing the second generation of the EDID file structure can still identify wearable glass projection device content rendering parameter simply by setting the EDID extension flag in an EDID file structure and including the EDID extension.

However, in wearable glass projection devices that do support the second generation of the EDID file structure, rather than using the EDID extension, step 604 can comprise extending the second generation of the EDID file structure to include a payload field comprising the wearable glass projection device content rendering parameter. Accordingly, in one or more embodiments step 604 comprises, in response to detecting establishment of a connection to a source device 608 at step 602, creating a second generation of the EDID file structure comprising the wearable glass projection device content rendering parameter. Step 604 can also include setting a flag in an EDID file structure and setting a display size in the EDID file structure to zero.

Step 605 then transmits the EDID extension or second generation of the EDID file structure to the source device 608. Step 606 receives content from the source device rendered in accordance with the wearable glass projection device content rendering parameter, while step 607 comprises presenting that rendered content to a user.

Advantageously, embodiments of the disclosure communicate a wearable glass projection device content rendering parameter to a source device 608 so that content can be properly rendered for a wearable glass projection device. In one or more embodiments, after receiving an EDID extension or second-generation EDID file structure, the source device 608 can then render the content for the wearable glass projection device with which it has established a display data channel 609.

Other operations can be performed as well. Illustrating by example, the source device 608 can use the EDID extension or second-generation EDID file structure to determine whether a companion device is a wearable glass projection device. Upon receiving the EDID extension and corresponding EDID file structure, or alternatively the second-generation EDID file structure, the source device 608 can determine whether the interpupillary distance included therewith is a non-zero value. Where it is, the source device 608 can determine that the companion device is the wearable glass projection device.

The source device 608 can then render content in accordance with the interpupillary distance and transmit the rendered content to the wearable glass projection device. This rendering can be done regardless of whether the wearable glass projection device is an augmented reality companion device or a virtual reality companion device in one or more embodiments. The method 600 therefore allows perfectly rendered content to be delivered to a wearable glass projection device for the enjoyment thereof by a user. The method 600 facilitates "on the go" consumption of content that is perfectly rendered.

Figure 7:
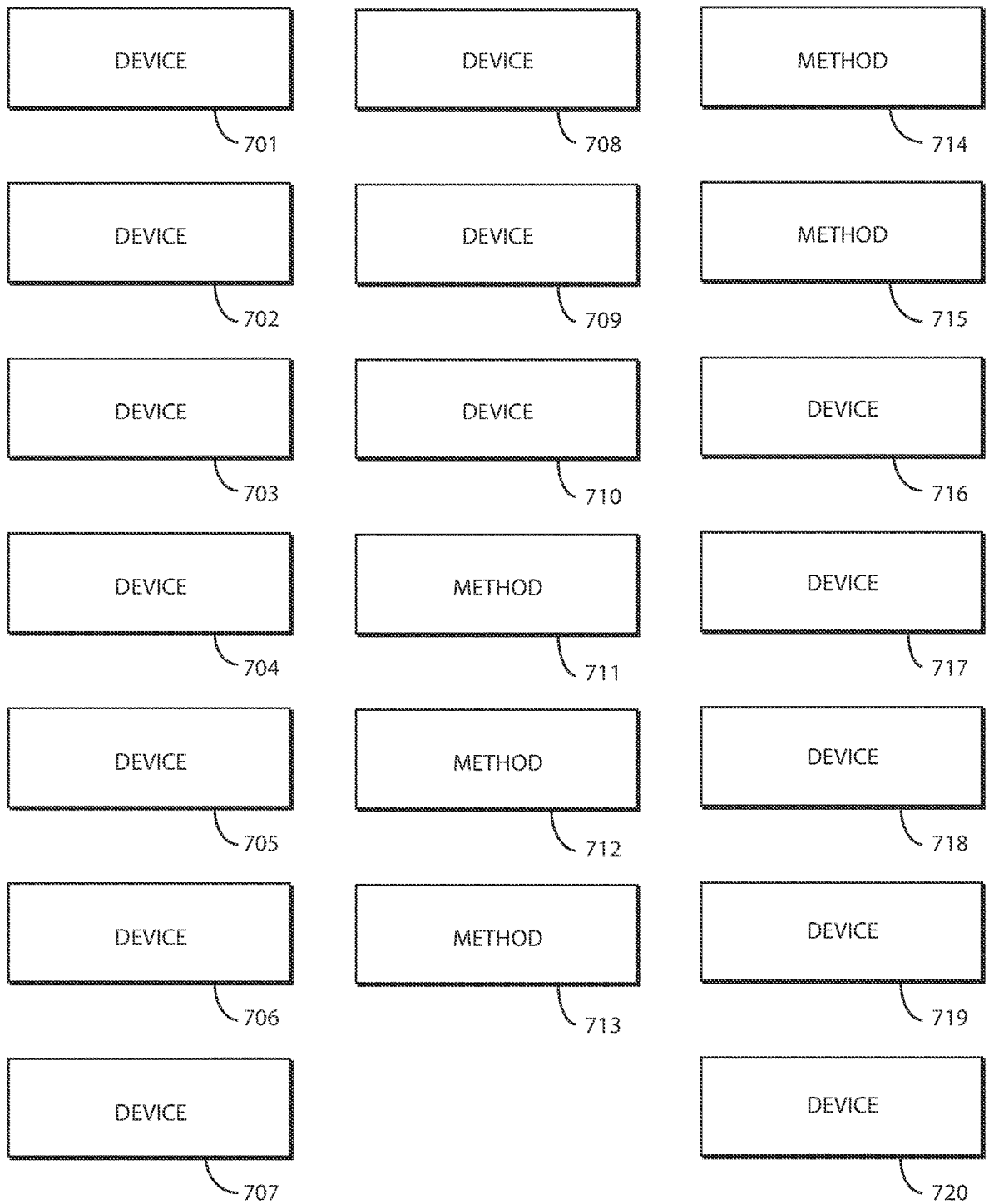
FIG. 7 illustrates various embodiments of the disclosure.

Turning now to FIG. 7, illustrated therein are various embodiments of the disclosure. The embodiments of FIG. 7 are shown as labeled boxes in FIG. 7 due to the fact that the individual components of these embodiments have been illustrated in detail in FIGS. 1-6, which precede FIG. 7. Accordingly, since these items have previously been illustrated and described, their repeated illustration is no longer essential for a proper understanding of these embodiments. Thus, the embodiments are shown as labeled boxes.

At 701, a wearable glass projection device which is connectable to a source device comprises a projector having lenses. At 701, the lenses focus images from the projector at an image focus optical center that is a function of an interpupillary distance defined by positions of the lenses in the wearable glass projection device.

At 701, the wearable glass projection device comprises one or more processors operable with the projector. At 701, the wearable glass projection device comprises a communication device operable with the one or more processors.

At 701, in response to the communication device detecting establishment of a display data channel with the source device, the one or more processors create an EDID extension comprising an indication of the interpupillary distance. At 701, the one or more processors cause the communication device to transmit the EDID extension to the source device using the display data channel.

At 702, the indication of the interpupillary distance of 701 is expressed as a distance measurement. At 703, the indication of the interpupillary distance of 701 is expressed as a default measurement combined with an adjustment measurement per lens.

At 704, the one or more processors of 701, in response to the communication device receiving an EDID request, cause the communication device to transmit an EDID file to an external electronic device. At 705, the EDID file of 704 comprises slice assignments of each lens of the lenses. At 706, the one or more processors of 704 cause the communication device to transmit the EDID extension with the EDID file in response to the EDID request.

At 707, the one or more processors of 701 further, in response to the communication device detecting establishment of the display data channel with the source device, set an EDID extension flag in an EDID file. At 707, the one or more processors cause the communication device to transmit the EDID file comprising the EDID extension flag with the EDID extension.

At 708, the indication of the interpupillary distance of 701 defines a data block of the EDID extension. At 709, the EDID extension of 708 further comprises a plurality of timing descriptors. At 710, the EDID extension of 709 further comprises a revision number.

At 711, a method in a wearable glass projection device comprises detecting, with a communication device, a source device establishing a display data channel with a communication device of the wearable glass projection device. At 711, the method comprises writing, with one or more processors, an indication of an interpupillary distance associated with a physical configuration of the wearable glass projection device to an EDID extension. At 711, the method comprises transmitting the EDID extension using the display data channel in response to the communication device detecting establishment of the display data channel.

At 712, the method of 711 further comprises setting, with the one or more processors in an EDID file, an EDID extension flag. At 712, the method comprises transmitting, with the communication device, the EDID file with the EDID extension using the display data channel.

At 713, the method of 711 further comprises receiving, with the communication device, an EDID file request. At 713, the method comprises transmitting, with the communication device, the EDID file in response to the EDID file request to a remote electronic device. At 714, the EDID file of 713 comprises one or more slice assignments for lenses of the wearable glass projection device. At 715, the detecting the source device establishing the display data channel of 711 with the communication device of the wearable glass projection device comprises detecting wireless communication between the source device and the wearable glass projection device.

At 716, an augmented reality device comprises an augmented reality presentation device, a communication device, and one or more processors operable with the communication device and the augmented reality presentation device. At 716, the one or more processors, in response to the communication device establishing a display data channel, cause the communication device to transmit an EDID extension comprising an augmented reality content rendering parameter of the augmented reality presentation device using the display data channel.

At 717, the augmented reality content rendering parameter of 716 comprises an interpupillary distance associated with a physical configuration of the augmented reality device. At 718, the augmented reality content rendering parameter of 716 comprises at least one adjustment from a default interpupillary distance.

At 719, the one or more processors of 716 further cause the communication device to transmit an EDID file comprising an EDID extension flag to using the display data channel. At 720, the one or more processors of 718 cause the communication device to transmit the EDID file comprising the EDID extension flag with the EDID extension after a display size parameter of the EDID file is set to zero.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A wearable glass projection device which is connectable to a source device, the wearable glass projection device comprising:
   lenses focusing images from a projector at an image focus optical center that is a function of an interpupillary distance defined by positions of the lenses in the wearable glass projection device;
   one or more processors operable with the projector; and
   a communication device operable with the one or more processors;
   the one or more processors, in response to the communication device detecting establishment of a display data channel (DDC) with the source device, creating an extended display identification (EDID) extension comprising an indication of the interpupillary distance and causing the communication device to transmit the EDID extension to the source device using the DDC;
   wherein the indication of the interpupillary distance is expressed as a default measurement combined with an adjustment measurement per lens;
   wherein the indication of the interpupillary distance distinguishes the wearable glass projection device from a projector or monitor to the source device.

2. The wearable glass projection device of claim 1, wherein the adjustment measurement per lens is expressed as a distance measurement that add to, or subtract from, the default measurement by a number expressed in millimeters.

3. The wearable glass projection device of claim 1, wherein the wearable glass projection device comprises a virtual reality companion device.

4. The wearable glass projection device of claim 1, the one or more processors, in response to the communication device receiving an EDID request, causing the communication device to transmit an EDID file to an external electronic device.

5. The wearable glass projection device of claim 4, the EDID file comprising slice assignments for each lens of the lenses.

6. The wearable glass projection device of claim 4, wherein the one or more processors cause the communication device to transmit the EDID extension with the EDID file in response to the EDID request.

7. The wearable glass projection device of claim 1, the one or more processors further, in response to the communication device detecting establishment of the DDC with the source device, setting an EDID extension flag in an EDID file and causing the communication device to transmit the EDID file comprising the EDID extension flag with the EDID extension.

8. The wearable glass projection device of claim 1, wherein the indication of the interpupillary distance defines a data block of the EDID extension.

9. The wearable glass projection device of claim 8, the EDID extension further comprising a plurality of timing descriptors.

10. The wearable glass projection device of claim 9, the EDID extension further comprising a revision number.

11. A method in a wearable glass projection device, the method comprising:

detecting, with a communication device, a source device establishing a display data channel (DDC) with a communication device of the wearable glass projection device;

writing, with one or more processors, an indication of an interpupillary distance associated with a physical configuration of the wearable glass projection device to an extended display identification (EDID) extension; and transmitting the EDID extension using the DDC in response to the communication device detecting establishment of the DDC;

wherein an EDID file structure including the EDID extension comprises one or more slice assignment for lenses of the wearable glass projection device that combine with the interpupillary distance to define a two-metric code identifying the wearable glass projection device as a wearable glass projection type device for the source device.

12. The method of claim 11, further comprising:
setting, with the one or more processors in an EDID file, an EDID extension flag; and
transmitting, with the communication device, the EDID file with the EDID extension using the DDC.

13. The method of claim 11, further comprising:
receiving, with the communication device, an EDID file request; and
transmitting, with the communication device, the EDID file in response to the EDID file request to a remote electronic device.

14. The method of claim 13, further comprising receiving content from the source device and presenting the content rendered in accordance with the indication of an interpupillary distance.

15. The method of claim 11, wherein the detecting the source device establishing the DDC with the communication device of the wearable glass projection device comprises detecting wireless communication between the source device and the wearable glass projection device.

16. An augmented reality device, comprising:
an augmented reality presentation device;
a communication device; and
one or more processors operable with the communication device and the augmented reality presentation device;
the one or more processors, in response to the communication device establishing a display data channel (DDC), causing the communication device to transmit an extended display identification (EDID) extension comprising an augmented reality content rendering parameter of the augmented reality presentation device using the DDC, the augmented reality content rendering parameter an indication of an interpupillary distance, represented as a default distance with adjustment measurements for the interpupillary distance on a per-lens basis;
wherein the indication of the interpupillary distance distinguishes the augmented reality presentation device from a projector or a monitor to a source device.

17. The augmented reality device of claim 16, the augmented reality content rendering parameter comprising an of an interpupillary distance associated with a physical configuration of the augmented reality device.

18. The augmented reality device of claim 17, the default distance defining a default interpupillary distance.

19. The augmented reality device of claim 18, the one or more processors further causing the communication device to transmit an EDID file comprising an EDID extension flag to using the DDC.

20. The augmented reality device of claim 19, the one or more processors causing the communication device to transmit the EDID file comprising the EDID extension flag with the EDID extension after slice assignments for a projector of the augmented reality device are written to the EDID file.

* * * * *